US009984104B2

United States Patent
Aravkin et al.

(10) Patent No.: US 9,984,104 B2
(45) Date of Patent: *May 29, 2018

(54) INDEXING CONTENT AND SOURCE CODE OF A SOFTWARE APPLICATION (71) Applicant: International Business Machines Corporation, Armonk, NY (US)

(72) Inventors: Aleksandr Y. Aravkin, Bronx, NY (US); Sasha P. Caskey, New York, NY (US); Ossama S. Emam, Giza (EG); Dimitri Kanevsky, Ossining, NY (US); Tara N. Sainath, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/994,224

(22) Filed: Jan. 13, 2016

(65) Prior Publication Data
US 2016/0125006 A1  May 5, 2016

Related U.S. Application Data (63) Continuation of application No. 14/094,834, filed on Dec. 3, 2013, now Pat. No. 9,286,338.

(51) Int. Cl.
G06F 17/30 (2006.01)
H04L 29/08 (2006.01)

(52) U.S. Cl.
CPC .. G06F 17/30321 (2013.01); G06F 17/30598 (2013.01); G06F 17/30864 (2013.01); H04L 67/34 (2013.01)

(58) Field of Classification Search
CPC combination set(s) only.
See application file for complete search history.

(56) References Cited

U.S. PATENT DOCUMENTS

| 7,231,405 | B2 | 6/2007 | Xia |
| 7,809,703 | B2 | 10/2010 | Balabhadrapatruni et al. |
| 7,886,267 | B2 | 2/2011 | Pratt et al. |

(Continued)

FOREIGN PATENT DOCUMENTS

JP    4927850 B2    5/2012

OTHER PUBLICATIONS

Bajracharya et al.; "Sourcerer: An Internet-Scale Software Repository"; ICSE '09 Workshop; Suite '09; May 16, 2009; Copyright 2009 IEEE.

(Continued)

*Primary Examiner* — Shyue Jiunn Hwa
(74) *Attorney, Agent, or Firm* — Tihon Poltavets (57) ABSTRACT

In a method for generating a searchable index from an analysis of a software application, receiving a first software application. The one or more processors determine that a first source code of the first software application is inaccessible. The one or more processors stimulate the first software application. The one or more processors analyze textual data resulting from the stimulation of the first software application. The one or more processors classify one or more images resulting from the stimulation of the first software application. The one or more processors index the analyzed textual data and the classified one or more images resulting from the stimulation of the first software application.

12 Claims, 5 Drawing Sheets (56) References Cited

U.S. PATENT DOCUMENTS

| | | | |
|---|---|---|---|
| 8,122,017 | B1 | 2/2012 | Sung et al. |
| 8,433,687 | B1 | 4/2013 | Pydi |
| 2007/0299825 | A1 | 12/2007 | Rush et al. |
| 2008/0147642 | A1* | 6/2008 | Leffingwell ....... G06F 17/30864 |
| 2009/0259987 | A1 | 10/2009 | Bergman et al. |
| 2012/0159625 | A1 | 6/2012 | Jeong et al. |
| 2012/0254835 | A1 | 10/2012 | Muddu et al. |
| 2013/0036117 | A1* | 2/2013 | Fisher ............... G06F 17/30041 |
| | | | 707/736 |
| 2014/0040273 | A1* | 2/2014 | Cooper ............... G06F 17/3002 |
| | | | 707/741 |
| 2014/0250098 | A1 | 9/2014 | Kasterstein et al. |
| 2014/0379696 | A1 | 12/2014 | Gyongyi et al. |
| 2015/0100563 | A1 | 4/2015 | Ellis |
| 2015/0154236 | A1 | 6/2015 | Aravkin et al. |

OTHER PUBLICATIONS

Bajracharya et al.; "Searching API Usage Examples in Code Repositories with Sourcerer API Search"; Suite '10; May 1, 2012; pp. 5-8; Copyright 2010.

Hemel et al.; "Finding Software License Violations Through Binary Code Clone Detection"; MSR '11; May 21-22, 2011; Copyright 2011.

Mahmoud et al.; "Source Code Indexing for Automated Tracing"; TEFSE '11; May 23, 2011; pp. 3.-6; Copyright 2011.

McMillan et al.; "Exemplar: A Source Code Search Engine for Finding Highly Relevant Applications"; IEEE Transactions on Software Engineering; vol. 38; No. 5; Sep./Oct. 2012; pp. 1069-1087; Published by the IEEE Computer Society; Copyright 2012 IEEE.

* cited by examiner

INDEXING CONTENT AND SOURCE CODE OF A SOFTWARE APPLICATION

FIELD OF THE INVENTION

The present invention relates generally to the field of web indexing software, and more particularly to indexing content and source code of software applications.

BACKGROUND OF THE INVENTION

Search engines are known. Search engines enable users to search for documents on the World Wide Web (WWW). A search engine searches documents for specified keywords and returns a list of the documents to a user probing for pertinent information. A search engine is a general class of programs.

Conventional search engines work by sending out a spider to fetch as many documents as possible. The term "search engine spider" can be used interchangeably with the term "search engine crawler." A spider is a program that a search engine uses to seek out and index the information that it finds. Traditionally, the search engine spider "reads" the text on the web page, or collection of web pages, and records any hyperlinks it finds. Search engines can have spiders visit many sites in parallel, so that efficient cataloging will occur. Spiders visit sites that have been submitted by website owners as new or updated.

The spider method of cataloging information usually entails another program called an indexer which reads documents and creates a record based on the words contained in each document. Indexing facilitates finding pertinent references for searchers using a variety of keywords and gathering similar information under a single topic. Web indexing refers to various methods for indexing the contents of a website or of the Internet as a whole.

SUMMARY

Aspects of an embodiment of the present invention disclose a method, computer program product, and computing system for generating a searchable index from an analysis of a software application. The method includes receiving a first software application. The method further includes one or more processors determining that a first source code of the first software application is inaccessible. The method further includes the one or more processors stimulating the first software application. The method further includes the one or more processors analyzing textual data resulting from the stimulation of the first software application. The method further includes the one or more processors classifying one or more images resulting from the stimulation of the first software application. The method further includes the one or more processors indexing the analyzed textual data and the classified one or more images resulting from the stimulation of the first software application.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. The following Figures provide an illustration of one embodiment. The embodiment, taken in part or in whole, does not imply any limitations with regard to the environments in which different embodiments may be implemented.

Figure 1:
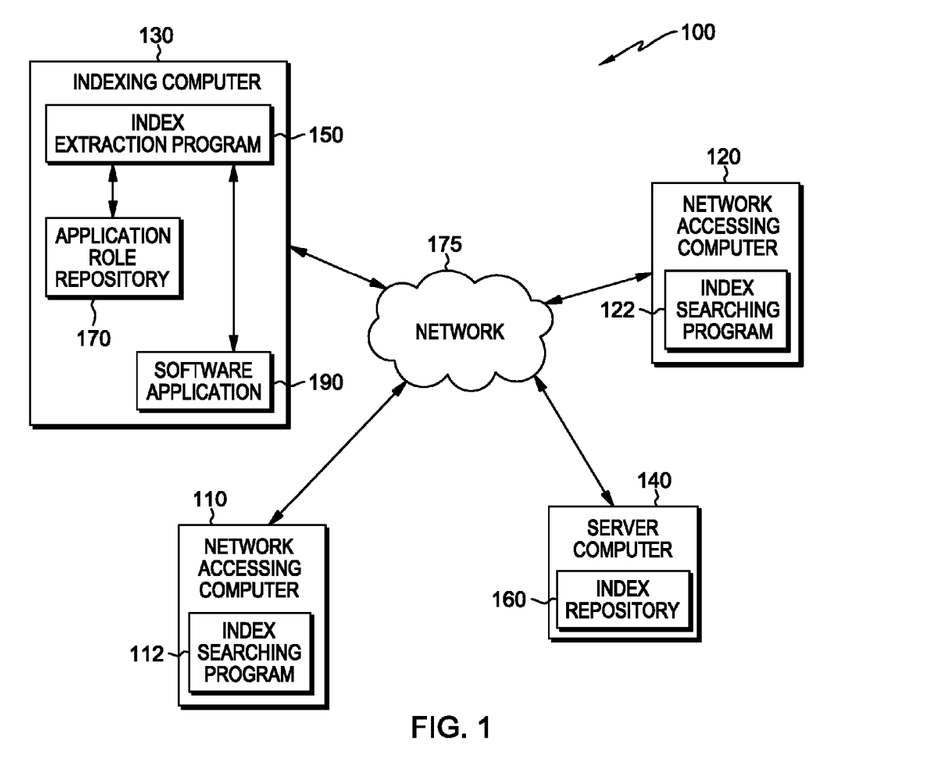
FIG. 1 is a diagram illustrating a distributed data processing environment in accordance with one embodiment of the present invention.

FIG. 1 is a diagram illustrating a distributed data processing environment 100 in accordance with one embodiment of the present invention. Distributed data processing environment 100 includes indexing computer 130, server computer 140, and network accessing computers 110 and 120 all interconnected over network 175. Indexing computer 130, server computer 140, and network accessing computers 110 and 120 may each include components as depicted in further detail with respect to FIG. 3. Network 175 may be a local area network (LAN), a wide area network (WAN) such as the Internet, any combination thereof, or any combination of connections and protocols that will support communications among indexing computer 130, server computer 140, and network accessing computers 110 and 120 in accordance with embodiments of the invention. Network 175 may include wired, wireless, or fiber optic connections. Distributed data processing environment 100 may include additional servers, computers, or other devices not shown.

Network accessing computers 110 and 120 may each be laptop computers, tablet computers, netbook computers, personal computers (PC), desktop computers, personal digital assistants (PDA), smart phones, or any programmable electronic devices capable of communicating with other devices, such as server computer 140, via network 175.

Network accessing computers 110 and 120 contain index searching programs 112 and 122, respectively. Index searching programs 112 and 122 utilize the information extracted by index extraction program 150 and stored in index repository 160. Index searching programs 112 and 122 include, but are not limited to: (i) search engine spiders; (ii) general public searching for index information; and (iii) programs that emulate human behavior, such as artificial intelligence automata, with sufficient intelligence to act as a user searching for index information.

Server computer 140 may be a management server, a web server, or any other electronic device or computing system capable of receiving and sending data. In other embodiments, server computer 140 may represent a server computing system utilizing multiple computers as a server system, such as in a cloud computing environment. Server computer 140 contains index repository 160.

Index repository 160 is an information store. Index repository 160 holds information extracted by index extraction program 150. In one embodiment, index repository 160 is a data file that can be written to and read by index extraction program 150 and read by index searching programs 112 and 122. In other embodiments, index repository 160 may be a database that can be written to and read by index extraction program 150. In one embodiment, index repository 160 is located on server computer 140. In other embodiments, index repository 160 may be located on indexing computer 130, another server, or another computing device (shown or not shown), provided that index repository 160 is accessible to index extraction program 150 and index searching programs 112 and 122.

Index computer 130 may be a laptop computer, tablet computer, netbook computer, personal computer (PC), desktop computer, personal digital assistant (PDA), smart phone, or any programmable electronic device capable of communicating with other devices, such as server computer 140, via network 175. Index computer 130 contains index extraction program 150 and application role repository 170.

Index extraction program 150 operates to extract index information from non-traditional electronic media. Embodiments of index extraction program 150 extends indexing capabilities from traditional indexing to non-traditional media, such as pictures, video, textual data contained within a software application, and artifacts of software applications. An artifact can be any output produced by a set of computer instructions. In one embodiment, index extraction program 150 indexes both human readable text and artifacts of software applications, such as screen shots and different modality streams. Index extraction program 150 communicates with application role repository 170. Application role repository 170 holds a cross-reference of software applications and their generated artifacts.

In one embodiment, index extraction program 150 resides on indexing computer 130. In another embodiment, index extraction program 150 may reside on another computer or another computing device, provided that index extraction program 150 has access to software application 190, application role repository 170, and index repository 160.

Application role repository 170 is an information store. Application role repository 170 contains a cross-reference of software applications and their generated artifacts. Examples of the contents within application role repository 170 include, but not limited to: (i) a word processing program being crossed referenced with its artifact, text; (ii) an aircraft caution and warning program being crossed referenced with its artifact, warning data; (iii) a computer backup program being crossed referenced with its artifact, backup data; and (iv) so on and so forth. Application role repository 170 can be in the form of a: (i) database; (ii) flat file; (iii) or any structure that would facilitate access and security of such information. The information within the information store is obtainable through methods, whether custom or off-the-shelf, that facilitate access by authorized users. For example, such methods include, but are not limited to, a database management system (DBMS). In some embodiments, application role repository 170 may be a database.

Embodiments of the present invention recognize that as content moves away from web pages into proprietary formats, like software applications, conventional indexing methods will no longer work. Additionally, the rise in usage of hand held devices push content away from traditional publishing methods (i.e. web based) to more proprietary methods encoded inside software applications. These applications include, but are not limited to: (i) games for various game consoles; (ii) applications written for small devices, such as smart phones; and (iii) domain specific applications (e.g. medical, social networking, etc). Therefore, there exists a need for a method to index both human readable text and artifacts of software applications in software applications. Nevertheless, whenever the source code is available and accessible, it is difficult to identify the parts of the code that correspond to certain functionality of a software application unless the source code is very well documented.

Figure 2:
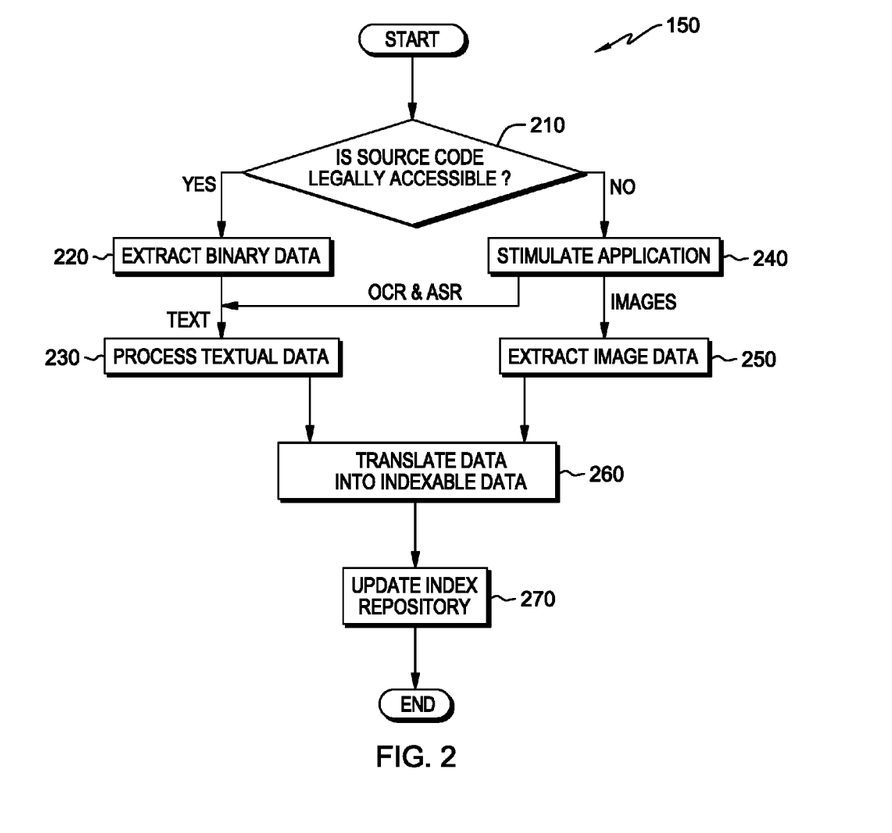
FIG. 2 is a flowchart depicting operational steps of an index extraction program executing within the distributed data processing environment of FIG. 1, for indexing both the artifacts and source code of a software application in accordance with one embodiment of the present invention.

FIG. 2 is a flowchart depicting operational steps of index extraction program 150 executing within the distributed data processing environment of FIG. 1, indexing both human readable text and artifacts of software applications in accordance with one embodiment of the present invention.

In one embodiment, initially, indexing computer 130 invokes index extraction program 150. Software application 190 may have been preselected to be indexed by index extraction program 150 or a user may select software application 190 as the software application to be indexed by index extraction program 150.

Index extraction program 150 branches whether the source code licensing permits accessibility. In decision 210, index extraction program 150 determines, based upon available license information for software application 190, if index the source code of software application 190 can be accessed. In one embodiment, index extraction program 150 determines accessibility by searching and comparing a catalog known legal phases (not shown) to textual phases within the source code. If index extraction program 150 determines the source code of software application 190 can be accessed (decision 210, yes branch), index extraction program 150 proceeds to step 220. If index extraction program 150 determines that the source code of software application 190 cannot be accessed (decision 210, no branch), index extraction program proceeds to step 240. If the license information is ambiguous, inconsistent, or simply missing, index extraction program 150 determines that the source code of software application 190 cannot be accessed (decision 210, no branch) and proceeds to step 240.

In step 220, index extraction program 150 extracts the binary file data of software application 190. In one embodiment, index extraction program 150 examines the source code of software application 190. An examination of the source code can provide textual content that is indexable. Indexable textual content of interest includes, but is not limited to: (i) text strings; (ii) source code extraction; and (iii) metadata. The indexable textual content gathered in step 220 is characterized as unstructured.

For example, many software applications produce text strings that are displayed to the user of the software application during execution. Usually, these text strings are embedded within the software application. For example, the code, written in the C language—printf("hello world");—will be translated into a binary format, which can be searched. Searching the binary format produces the text string "hello world."

Source code extraction, for one embodiment, functions in a similar manner as string extraction, however, rather than looking for strings the source code is examined for content that would be of interest to indexing.

Metadata extraction, for one embodiment, functions in a similar manner as string extraction. More specifically, within the source code, indexable textual content may be embedded within metadata. For instance, indexable textual content of interest, e.g. "hello world," may be enclosed between metadata symbols "<<" and ">>," as <<hello world>>.

In step 230, index extraction program 150 processes textual data by translating unstructured texts and performing language and encoding detection. In step 230, index extraction program 150 processes the textual content extracted in step 220 (and step 240, which will be discussed shortly) through text processing software instructions. In this embodiment, the text processing software instructions are: (i) segmentation; (ii) language and encoding detection; and (iii) relation mention detection. Furthermore, both segmentation and relation mention detection (also referred to as "mention/relation detection") generate summaries to be processed by step 260 (discussed shortly).

Stimulate application 240 performs the following tasks: (i) language and encoding detection for software application 190; (ii) segmentation for software application 190, text is separated into smallest segments that are still meaningful to index; (iii) relation mention detection for software application 190, relation mention detection includes, but is not limited to: (a) times, (b) locations, and (c) named entities, and (d) provides a semantic interpretation of the text; (iv) summaries are generated for software application 190; and (v) summaries are prepared for indexing.

In step 240, index extraction program 150 stimulates software application 190 whenever index extraction program 150 does not have permission to view the source code. In one embodiment, index extraction program 150 will interact with software application 190 in a variety of ways. For instance, by taking snapshots of code generated artifacts, including, but not limited to: (i) image extractions; (ii) character recognition; and (iii) speech extraction using automatic speech recognition (ASR). In order to capture these artifacts software application 190 is executed with proper input stimulation. Software application 190 can be executed within an artificial environment (as in a virtual machine environment) or within a native environment. Images are sent to an image processor to be processed in step 250, while optical character reading (OCR) and automatic speech recognition (ASR) type content are sent to a text processor to be processed in step 230; step 230 was formerly discussed.

In another embodiment the software application 190 is simulated. Simulation of software application 190 can be executed within an artificial environment (as in a virtual machine environment) or within a native environment. The simulation of software application 190 is such that it will preserve the inputs and outputs to and from the application and the math models of software application 190.

Furthermore, in step 240, to better classify the type of software application under stimulation, application role repository 170 (see FIG. 1) is utilized. Application role repository 170 is an information store. Application role repository 170 holds a cross-reference of applications and their generated artifacts. For instance, when stimulating a speech recognition application the artifact produced may be a textual representation of the verbal input. A query of application role repository 170 would result in the application being identified as a speech recognition application, and therefore be indexed as such.

The artifacts that are produced by an application, and consequently cross-reference in application role repository 170, are varied in modality streams. Artifacts include, but are not limited to: (i) sensation, such as heat or cold; (ii) smell; (iii) tactile sensations; and (iv) sounds. For instance, if the application under stimulation produces a smell or process a smell in some way (e.g. identifies, finds, or tracks using smell) one embodiment of the present invention would index it as such.

In step 250, index extraction program 150 extracts image data as a set of images, possibly video, by software instructions to perform both an image classification and key frame extraction. Important components of the frame are extracted, such as images. For example: (i) images of football fields or football players would correspond to sports video games or sports game simulations; (ii) images of cars or roads correspond to driving emulations or driving video games; and (iii) images that have computer menu components (e.g. windows button, edit icons, and arrow/box/circle icons) correspond to editing or graphic building programs (that edit text or multimedia). The object identification is performed with respect to a database of commonly encountered objects in different applications that is built in advance. In addition to identifying objects, index extraction program 150 identifies interactions/dynamic behavior between objects to further specify the application. In the car example above, a moving car likely corresponds to a video game, while a stationary representation of a car with text can correspond to a car parts ordering program, or a 'fix it yourself' guide. These components, images, are processed by instructions to perform semantic classification.

In step 260, index extraction program 150 processes data from step 230 and/or data from step 250 by translating data into indexable data. After data is identified, an automatic summary of the data description is performed in order to generate an index.

For example, when software application 190 is software that produces food recipes for pasta, index extraction program 150, in step 260, would produce two indexes: (i) an index for the pasta recipes, and (ii) an index indicating that software application 190 is software that produces food recipes. The second index is stored in application role repository 170, and used in step 240, as previously discussed. Furthermore, summaries from step 220 are indexed in step 260. The first index is a summary of the media produced by the application. A person searching specifically for pasta recipes can find the recipes produced by the application. The second index is a meta-summary related to the application itself, so that it is accessible to people who are searching, e.g. for cognitive systems that generate food recipes.

In step 260, index extraction program 150 may also suggest part of the code for a new application. Software application starts in the simulated environment. The system interacts with the software application 190 in a variety of ways, and takes snapshots of its integration with the code. The system identifies the parts of the code that correspond to certain functionalities of a software application. Various variants of codes are treated as models that may generate some parts of applications. Each of these models is represented as columns "h(I)" in a sensing matrix "H." A new application is represented as a vector "y." Finding the most relevant code given an application can be represented as a sparse regression of this optimization problem for "x," as described by the following equation, equation (A).

$$\min|y-Hx|^2 \qquad \text{Equation (A):}$$

In step 270, index extraction program 150 stores indexing information in index repository 160. Index repository 160 is an information store. Index repository 160 can be in the form of a: (i) database; (ii) flat file; (iii) or any structure that would facilitate access and security of such information. The information within the information store is obtainable through methods, whether custom or off-the-shelf, that facilitate access by authorized users. For example, such methods include, but are not limited to, a database management system (DBMS).

Updating index repository 160 involves communication between index extraction program 150 and index repository 160. The method to communicate over a network, such as network 175, see FIG. 1, (sometimes referred to as "data handshaking") may include, but not limited to: (i) emailing requests and responses, using possibly simple mail transfer protocol (SMTP); (ii) off-the-shelf or custom-developed applications that allow data transferring; (iii) extensible markup language (XML), or variations of such, one being "beep" (Blocks Extensible Exchange Protocol); (iv) transmission control protocol/internet protocol TCP/IP or its derivatives; (v) process communication, such as messaging; and (vi) using computer browsers for the inquiries and responses. For instance, using an off-the-shelf or custom-developed application, a transmission control protocol/internet protocol (TCP/IP) can be established to pass the data to and from index repository 160.

Figure 3:
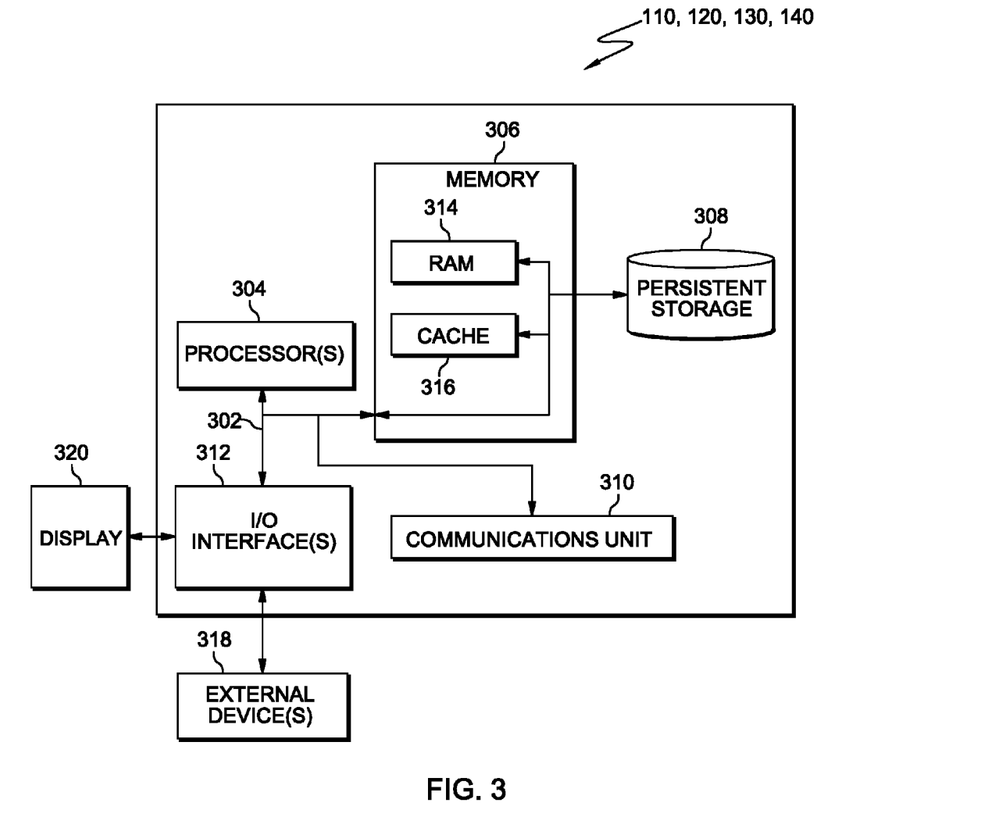
FIG. 3 depicts a block diagram of components of network accessing computer, network accessing computer, indexing computer, and server computer in accordance with one embodiment of the present invention.

FIG. 3 depicts a block diagram of components of network accessing computer 110, network accessing computer 120, indexing computer 130, and server computer 140 in accordance with one embodiment of the present invention. It should be appreciated that FIG. 3 provides only an illustration of one implementation and does not imply any limitations with regard to the environments in which different embodiments may be implemented. Many modifications to the depicted environment may be made.

Network accessing computer 110, network accessing computer 120, indexing computer 130, and server computer 140 each include communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Index extraction program 150, application type repository 170, and software application 190 are stored in persistent storage 308 of indexing computer 130 for execution and/or access by one or more of the respective computer processors 304 of indexing computer 130 via one or more memories of memory 306 of indexing computer 130. Index repository 160 is stored in persistent storage 308 of server computer 140 for access by one or more of the respective computer processors 304 of server computer 140 via one or more memories of memory 306 of server computer 140. Index searching program 112 is stored in persistent storage 308 of network accessing computer 110 for execution by one or more of the respective computer processors 304 of network accessing computer 110 via one or more memories of memory 306 of network accessing computer 110. Index searching program 122 is stored in persistent storage 308 of network accessing computer 120 for execution by one or more of the respective computer processors 304 of network accessing computer 120 via one or more memories of memory 306 of network accessing computer 120. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of enterprise grid (not shown) and distributed data processing environment computers. In these examples, communications unit 310 includes one or more network interface cards. Communications unit 310 may provide communications through the use of either or both physical and wireless communications links. Index extraction program 150, application type repository 170, and software application 190 may be downloaded to persistent storage 308 of indexing computer 130 through communications unit 308 of indexing computer 130. Index repository 160 may be downloaded to persistent storage 308 of server computer 140 through communication unit 308 of server computer 140. Index searching program 112 may be downloaded to persistent storage 308 of network accessing computer 110 through communications unit 308 of network accessing computer 110. Index searching program 122 may be downloaded to persistent storage 308 of network accessing computer 120 through communications unit 308 of network accessing computer 120.

I/O interface(s) 312 allows for input and output of data with other devices that may be connected to distributed data processing environment computers. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., index extraction program 150, application type repository 170, and software application 190, can be stored on such portable computer-readable storage media and can be loaded onto persistent storage 308 of indexing computer 130 via I/O interface(s) 312 of indexing computer 130. Software and data used to practice embodiments of the present invention, e.g., index repository 160, can be stored on such portable computer-readable storage media and can be loaded onto persistent storage 308 of server computer 140 via I/O interface(s) 312 of server computer 140. Software and data used to practice embodiments of the present invention, e.g., index searching program 112, can be stored on such portable computer-readable storage media and can be loaded onto persistent storage 308 of network accessing computer 110 via I/O interface(s) 312 of network accessing computer 110. Software and data used to practice embodiments of the present invention, e.g., index searching program 122, can be stored on such portable computer-readable storage media and can be loaded onto persistent storage 308 of network accessing computer 120 via I/O interface(s) 312 of network accessing computer 120. I/O interface(s) 312 also connect to a display 320.

Display 320 provides a mechanism to display data to a user and may be, for example, a computer monitor.

Now that the embodiment(s) of FIGS. 1 through 3 have been fully discussed, some additional discussion and embodiments of the present invention will be discussed in the following paragraphs.

Figure 4:
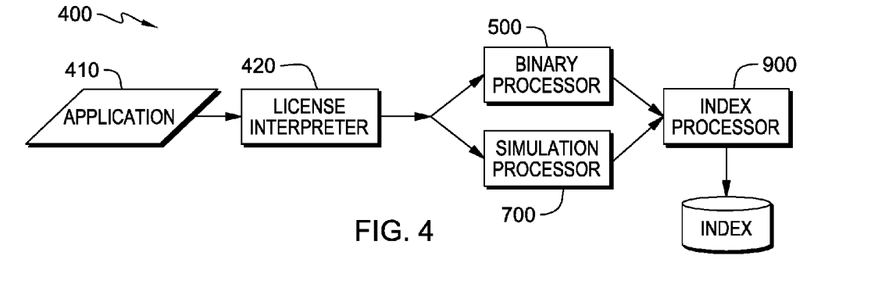
FIG. 4 is a general functional block diagram of an embodiment of the present invention.

Turning now to FIG. 4, process 400, is a general functional block diagram of an embodiment of the present invention (henceforth, also referred to as "the system"). Process 400 is responsible for indexing the textual contents of the software application. The software application 410 is sent to license interpreter 420 to determine license type. For example, license types, in this embodiment of the present invention, includes, but is not limited to: (i) the system can look at the software application's source code; or (ii) the system cannot look at the software application's source code. Whenever the system can look at the source code, the software application is sent to binary processor 500; otherwise, the software application will be sent to simulation processor 700. Binary processor 500 and simulation processor 700 send their resulting data to index processor 900 to be indexed.

Figure 5:
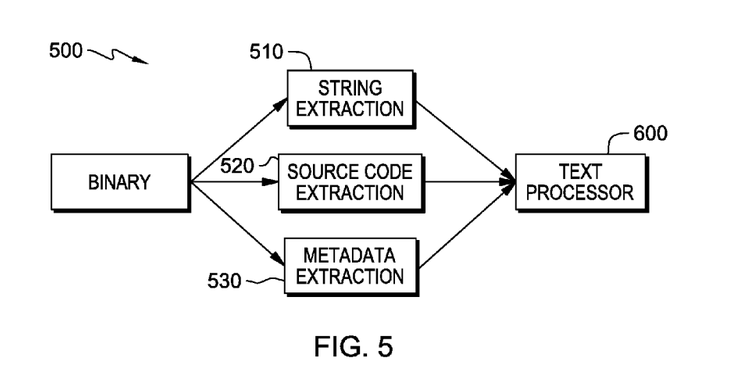
FIG. 5 is a functional block diagram of a binary processor in accordance with one embodiment of the present invention.

Turning now to FIG. 5. FIG. 5 is a functional block diagram of a binary processor in accordance with one embodiment of the present invention. Binary processor 500 performs: (i) string extraction 510; (ii) source code extraction 520; and (iii) metadata extraction 530. These processors produce one or more sets of text that is sent to text processor 600.

Figure 6:
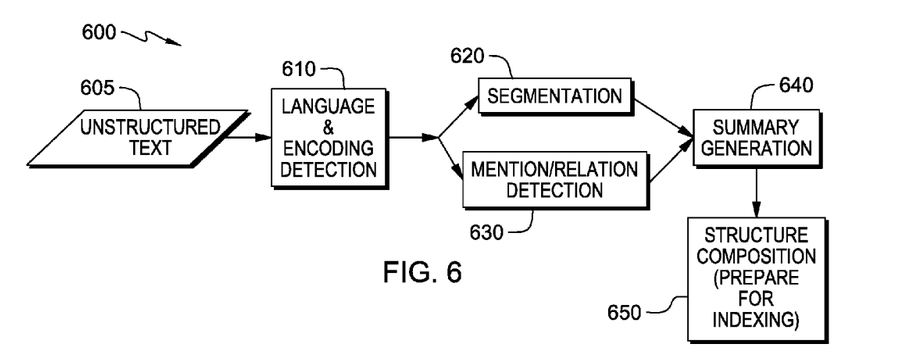
FIG. 6 is a functional block diagram of a text processor in accordance with one embodiment of the present invention.

Turning now to FIG. 6. FIG. 6 is a functional block diagram of a text processor in accordance with one embodiment of the present invention. Text processor 600 takes one or more sets of unstructured text 605 and performs language and encoding detection 610. After language and encoding detection 610 processing the text is separated into smaller segments that are easier to process. In addition, mention/relation detection 630 processing includes, but not limited to: (i) identification of times; (ii) locations; (iii) named entities; and (iv) so on and so forth. Mention/relation detection 630 provides a semantic interpretation of the text. Both segmentation 620 and mention/relation detection 630 are used to consequently generate summaries, identified in block summary generation 640. Finally, the summaries are passed to structure composition 650 which prepares the summaries for indexing.

Figures 7, 8:
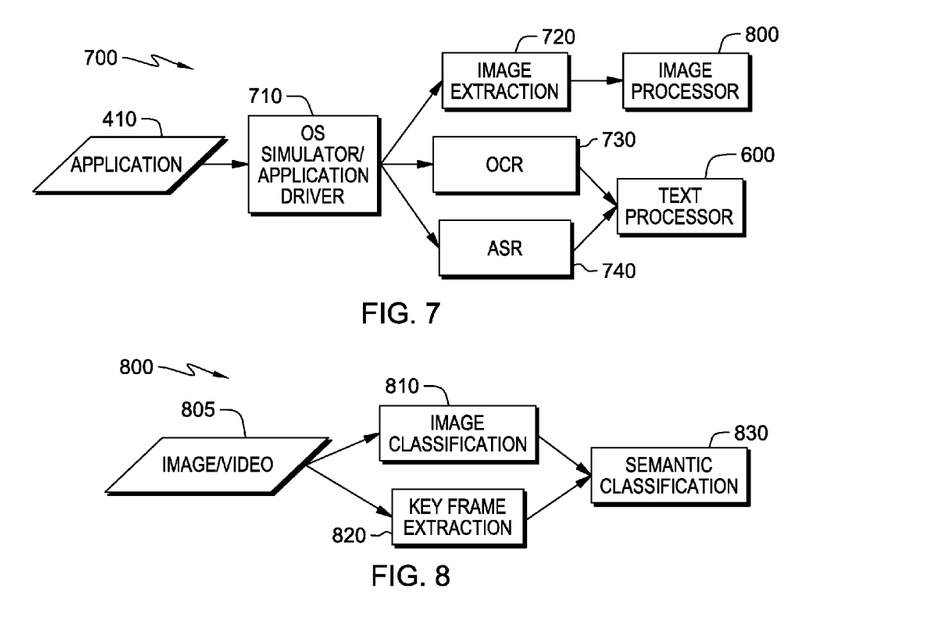
FIG. 7 is a functional block diagram of a simulation processor in accordance with one embodiment of the present invention.
FIG. 8 is a functional block diagram of an image processor in accordance with one embodiment of the present invention.

Turning now to FIG. 7. FIG. 7 is a functional block diagram of a simulation processor in accordance with one embodiment of the present invention. Simulation processor 700 runs software application 410 in the simulated environment. The system tries to interact with the application in a variety of ways using os simulator application driver 710. Additionally, when possible, the system takes snapshots of its integration with the code, which include, but not limited to: (i) image extraction 720; (ii) character recognition using OCR 730; and (iii) speech extraction using automatic speech recognition (ASR) 740. The extracted information is sent to image processor 800 and text processor 600, appropriately.

Turning now to FIG. 8. FIG. 8 is a functional block diagram of an image processor in accordance with one embodiment of the present invention. Image processor 800 processes imagery, which includes, but not limited to: (i) pictures, in conventional formats (e.g., jpeg, tiff, bmp, etc., and any future developed formats); (ii) streaming video, in conventional formats (e.g., wmv, avi, quicktime, etc., and any future developed formats); and (iii) non-streaming video, in conventional formats (digital video disk (DVD), Blu-Ray, high-density digital video disk (HD-DVD, etc., and any future developed formats). Image/video 805 is sent to both mage classification 810 and key frame extraction 820, which detects the important frames from the video or the set of pictures, so that important components of the scene are extracted. This information is handed to semantic classification 830.

Figure 9:
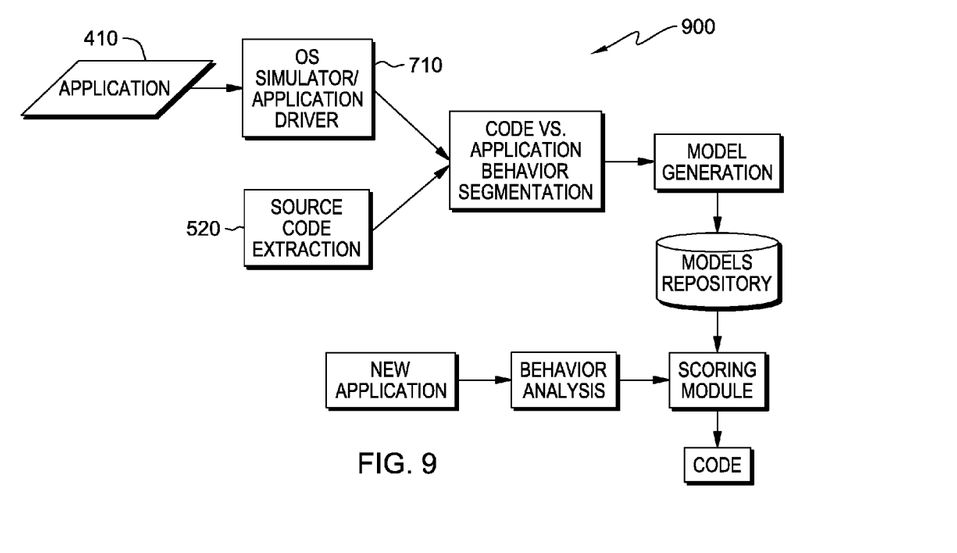
FIG. 9 is a functional block diagram of an index processor in accordance with one embodiment of the present invention.

Turning now to FIG. 9. FIG. 9 is a functional block diagram of an index processor in accordance with one embodiment of the present invention. Index processor 900 is responsible for indexing the source code of software application 410 and suggesting part of the code for new application. Software application 410 is started in the simulated environment, os simulator application driver 710. The system interacts with the software application 410 in a variety of ways, and takes snapshots of its integration with the code. The system identifies the parts of source code that correspond to certain functionalities of a software application by using source code extraction 520. Various variants of codes are treated as models that may generate some parts of applications. Each of these models are represented as columns "h(I)" in a sensing matrix "H." A new application is represented as a vector "y." Finding the most relevant code given application can be represented as a sparse regression of this optimization problem for "x," as described by the following equation, equation (B).

$$\min|y-Hx|^2 \qquad \text{Equation (B):}$$

The programs herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based devices that perform the specified functions or acts, or combinations of special purpose hardware and computer instructions.

What is claimed is:

1. A method for generating a searchable index from an analysis of a software application, the method comprising the steps of:

one or more processors determining whether first source code of a first software application is inaccessible;

responsive to determining that the first source code of the first software application is inaccessible, the one or more processors stimulating the first software application to perform one or more functionalities corresponding to the first source code of the first software application;

the one or more processors taking a snapshot of artifacts generated by the first source code of the first software application as a result of stimulation, wherein the artifacts comprise textual data and one or more images;

the one or more processors analyzing the textual data resulting from the stimulation of the first software application, wherein analyzing the textual data resulting from the stimulation of the first software application comprises separating the textual data resulting from the stimulation of the first software application into at least one smaller segment and generating a summary from the at least one smaller segment;

the one or more processors semantically classifying the one or more images resulting from the stimulation of the first software application;

the one or more processors indexing the analyzed textual data and the semantically classified one or more images resulting from the stimulation of the first software application;

the one or more processors extracting similar indexes as the indexed analyzed textual data and the semantically classified one or more images resulting from the stimulation of the first software application from an index repository; and the one or more processors storing the indexed analyzed textual data and the semantically classified one or more images resulting from the stimulation of the first software application cross-referred with the extracted similar indexes in the index repository.

2. The method of claim 1, the method further comprising:

the one or more processors receiving a second software application;

the one or more processors determining that a second source code of the second software application is accessible;

the one or more processors extracting textual data from the second source code of the second software application;

the one or more processors analyzing the textual data extracted from the second source code of the second software application; and the one or more processors indexing the analyzed textual data from the second source code.

3. The method of claim 1, wherein the step of the one or more processors analyzing the textual data resulting from the stimulation of the first software application comprises:

the one or more processors detecting textual data from the one or more images resulting from the stimulation of the first software application; and the one or more processors analyzing the textual data detected from the one or more images resulting from the stimulation of the first software application.

4. The method of claim 1, wherein the step of the one or more processors analyzing the textual data resulting from the stimulation of the first software application comprises using relation mention detection processing to analyze the textual data resulting from the stimulation of the first software application.

5. A computer program product for generating a searchable index from an analysis of a software application, the computer program product comprising:

one or more computer-readable storage media and program instructions stored on the one or more computer-readable storage media, the program instructions comprising:

program instructions to determine whether first source code of a first software application is inaccessible;

program instructions to, responsive to determining that the first source code of the first software application is inaccessible, stimulate the first software application to perform one or more functionalities corresponding to the first source code of the first software application;

program instructions to take a snapshot of artifacts generated by the first source code of the first software application as a result of stimulation, wherein the artifacts comprise textual data and one or more images;

program instructions to analyze the textual data resulting from the stimulation of the first software application, wherein analyzing the textual data resulting from the stimulation of the first software application comprises separating the textual data resulting from the stimulation of the first software application into at least one smaller segment and generating a summary from the at least one smaller segment;

program instructions to semantically classify the one or more images resulting from the stimulation of the first software application;

program instructions to index the analyzed textual data and the semantically classified one or more images resulting from the stimulation of the first software application;

program instructions to extract similar indexes as the indexed analyzed textual data and the semantically classified one or more images resulting from the stimulation of the first software application from an index repository; and program instructions to store the indexed analyzed textual data and the semantically classified one or more images resulting from the stimulation of the first software application cross-referred with the extracted similar indexes in the index repository.

6. The computer program product of claim 5 further comprising:

program instructions, stored on the one or more computer-readable storage media, to receive a second software application;

program instructions, stored on the one or more computer-readable storage media, to determine that a second source code of the second software application is accessible;

program instructions, stored on the one or more computer-readable storage media, to extract textual data from the second source code of the second software application;

program instructions, stored on the one or more computer-readable storage media, to analyze the textual data extracted from the second source code of the second software application; and program instructions, stored on the one or more computer-readable storage media, to index the analyzed textual data from the second source code.

7. The computer program product of claim 5, wherein the program instructions to analyze the textual data resulting from the stimulation of the first software application comprise:

program instructions, stored on the one or more computer-readable storage media, to detect textual data from the one or more images resulting from the stimulation of the first software application; and program instructions, stored on the one or more computer-readable storage media, to analyze the textual data detected from the one or more images resulting from the stimulation of the first software application.

8. The computer program product of claim 5, wherein the program instructions to analyze the textual data resulting from the stimulation of the first software application comprise program instructions to use relation mention detection processing to analyze the textual data resulting from the stimulation of the first software application.

9. A computer system for generating a searchable index from an analysis of a software application, the computer system comprising:

one or more computer processors, one or more computer-readable storage media, and program instructions stored on the one or more computer-readable storage media for execution by at least one of the one or more processors, the program instructions comprising:

program instructions to determine whether first source code of a first software application is inaccessible;

program instructions to, responsive to determining that the first source code of the first software application is inaccessible, stimulate the first software application to perform one or more functionalities corresponding to the first source code of the first software application;

program instructions to take a snapshot of artifacts generated by the first source code of the first software application as a result of stimulation, wherein the artifacts comprise textual data and one or more images;

program instructions to analyze the textual data resulting from the stimulation of the first software application, wherein analyzing the textual data resulting from the stimulation of the first software application comprises separating the textual data resulting from the stimulation of the first software application into at least one smaller segment and generating a summary from the at least one smaller segment;

program instructions to semantically classify the one or more images resulting from the stimulation of the first software application;

program instructions to index the analyzed textual data and the semantically classified one or more images resulting from the stimulation of the first software application;

program instructions to extract similar indexes as the indexed analyzed textual data and the semantically classified one or more images resulting from the stimulation of the first software application from an index repository; and program instructions to store the indexed analyzed textual data and the semantically classified one or more images resulting from the stimulation of the first software application cross-referred with the extracted similar indexes in the index repository.

10. The computer system of claim 9, further comprising:

program instructions, stored on the one or more computer-readable storage media for execution by at least one of the one or more processors, to receive a second software application;

program instructions, stored on the one or more computer-readable storage media for execution by at least one of the one or more processors, to determine that a second source code of the second software application is accessible;

program instructions, stored on the one or more computer-readable storage media for execution by at least one of the one or more processors, to extract textual data from the second source code of the second software application;

program instructions, stored on the one or more computer-readable storage media for execution by at least one of the one or more processors, to analyze the textual data extracted from the second source code of the second software application; and program instructions, stored on the one or more computer-readable storage media for execution by at least one of the one or more processors, to index the analyzed textual data from the second source code.

11. The computer system of claim 9, wherein the program instructions to analyze the textual data resulting from the stimulation of the first software application comprise:

program instructions, stored on the one or more computer-readable storage media, to detect textual data from the one or more images resulting from the stimulation of the first software application; and program instructions, stored on the one or more computer-readable storage media, to analyze the textual data detected from the one or more images resulting from the stimulation of the first software application.

12. The computer system of claim 9, wherein the program instructions to analyze the textual data resulting from the stimulation of the first software application comprise program instructions to use relation mention detection processing to analyze the textual data resulting from the stimulation of the first software application.

* * * * *